Feb. 15, 1938.  H. E. TWOMLEY  2,108,732
DRIVE FOR BOX LIDDING MACHINES
Filed April 29, 1935  4 Sheets-Sheet 1

Inventor
Herbert E. Twomley
By Lyon & Lyon
Attorneys

Feb. 15, 1938.   H. E. TWOMLEY   2,108,732
DRIVE FOR BOX LIDDING MACHINES
Filed April 29, 1935    4 Sheets-Sheet 3

Inventor
Herbert E. Twomley
By Lyon & Lyon
Attorneys

Feb. 15, 1938.  H. E. TWOMLEY  2,108,732
DRIVE FOR BOX LIDDING MACHINES
Filed April 29, 1935   4 Sheets-Sheet 4

INVENTOR.
Herbert E. Twomley
BY Lyon & Lyon
ATTORNEYS

Patented Feb. 15, 1938

2,108,732

UNITED STATES PATENT OFFICE 2,108,732

DRIVE FOR BOX LIDDING MACHINES

Herbert E. Twomley, Riverside, Calif., assignor, by mesne assignments, to Food Machinery Corporation, a corporation of Delaware Application April 29, 1935, Serial No. 18,767

3 Claims. (Cl. 1—10)

My invention relates to box lidding machines and has particular reference to driving mechanism which is employed for compressing and applying a cover to boxes which have been filled with suitable contents.

In the packing industry, particularly the industries engaged in the packing of fruits, vegetables and similar commodities, the boxes or crates which are employed to contain the various produce are filled and transported to a lidding machine, where a lid or cover is placed over the filled box or crate and is compressed down upon the contents and secured to the box by means of nails, straps or other suitable connecting devices.

In these industries it is the common practice, particularly in the packing of citrus fruits, lettuce and similar vegetables which are capable of withstanding considerable compression, to overfill the boxes by placing contents therein in sufficient quantity to extend a considerable distance above the side and end walls of the box and to employ the lidding machine as a means for compressing the overpacked contents into the box whereby normal shrinkage of the contents during transportation and storage will be compensated for by the compression of the fruit or vegetables, thus insuring that at the time the box reaches its destination the contents will still remain tightly packed therein.

Various lidding machines have been devised for applying such lids to such boxes, in which either the box is elevated against stationary pressing mechanisms which engage the cover and spring it down over the overpacked contents preparatory to the nailing or strapping of the cover to the box, or the pressing mechanisms are so mounted as to move toward a box held over a stationary supporting table to perform the cover springing and pressing operations.

It is an object of my invention, therefore, to provide a machine of the character described in the preceding paragraphs, in which the box is elevated toward substantially stationary pressing mechanisms which will perform the lid-springing and pressing operations.

Another object of the invention is to provide a machine of the character set forth in the preceding paragraphs wherein the driving apparatus employed for causing the movement of the box toward the pressing mechanisms may be of a simple and economical character.

Another object of the invention is to provide a driving mechanism for elevating boxes toward the lid pressing mechanisms, wherein a simple coupling between a drive-shaft and the box supporting table may be employed.

Another object of the invention is to provide a machine of the character set forth in which the box supporting table is arranged for movement from a normal position to an elevated position by means of one or more chains connected to the box supporting table to be wound up upon a drive-shaft upon a single rotation of the drive-shaft.

Another object of the invention is to provide elevating mechanism for a box supporting table in machines of the character described, in which the power employed to elevate the nailing table is provided only at such time as actual movement of the table is desired, and in which limiting mechanism may be employed to limit the lifting force to a predetermined value whereby crushing of the box or its contents is avoided.

Another object of the invention is to provide a lidding machine of the character set forth with a readily adjustable nailing mechanism to adapt the same to boxes of varying heights.

Other objects and advantages will be apparent from a study of the following specifications read in connection with the accompanying drawings, wherein Fig. 1 is a front elevational view of lidding machines constructed in accordance with my invention;

Figure 1:
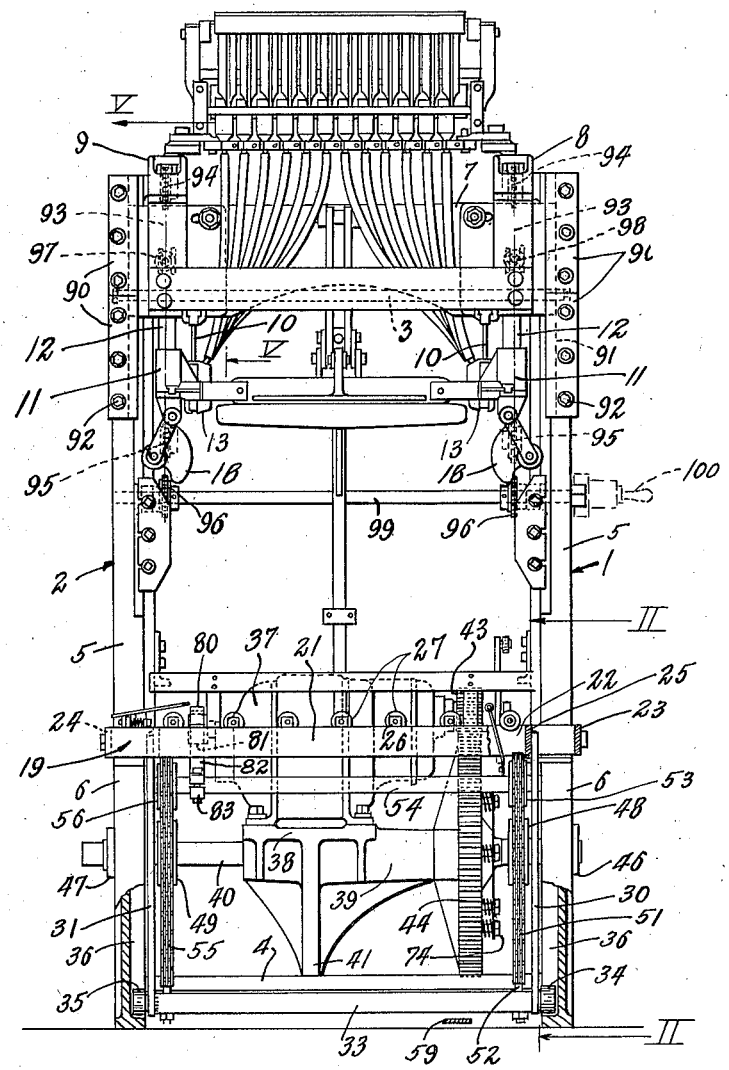

Referring to the drawings, I have illustrated in Fig. 1 a box lidding machine consisting essentially of a pair of side frames 1 and 2 suitably spaced apart and connected together by cross T bars 3 and 4 near the lower and upper ends of the frames, respectively.

Figure 2:
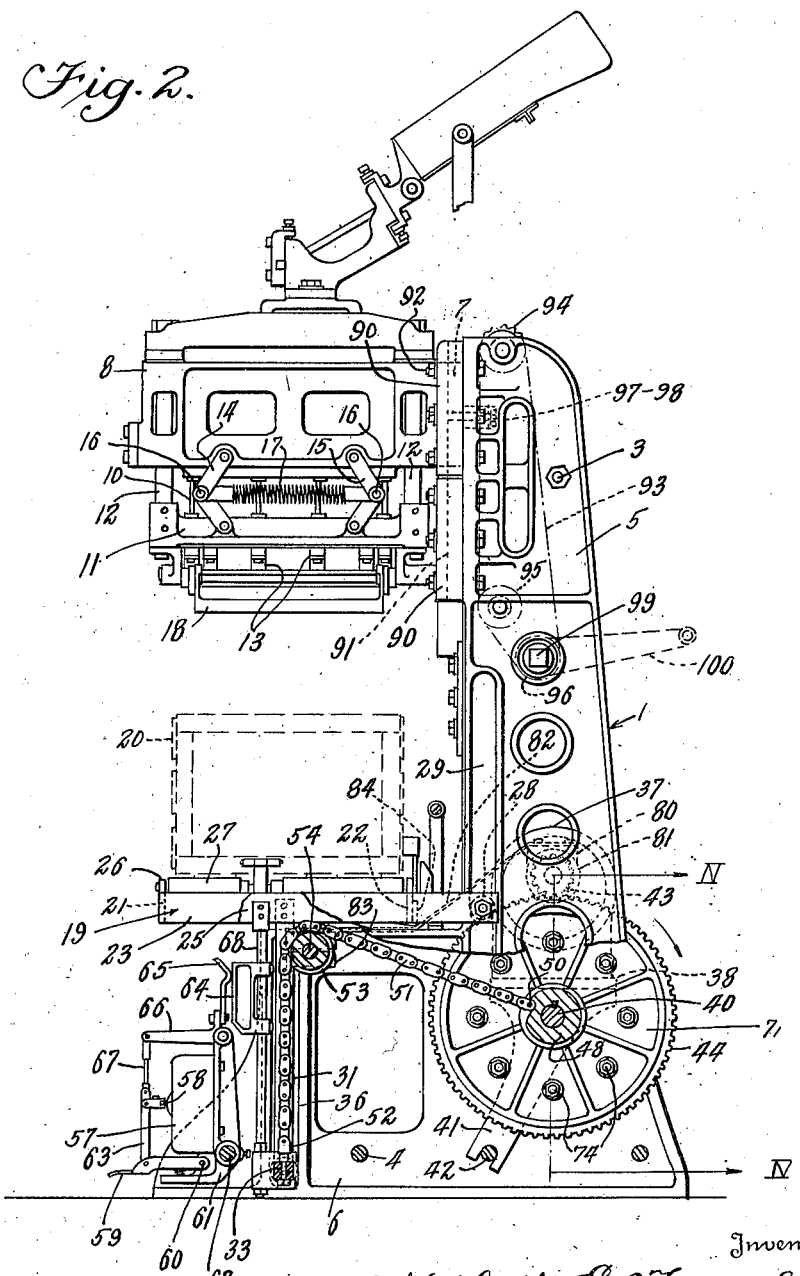
Fig. 2 is a side elevational view, shown partly in section, of the machine shown in Fig. 1.

By referring particularly to Fig. 2, it will be observed that the side frames are substantially L-shaped, having a major vertical portion, indicated by the reference character 5, and a minor horizontal portion, indicated by the reference character 6. The upper end of the major vertical portion of the frame is employed as a supporting means for the lid-applying mechanisms, such as the nailing mechanism, lid-pressing mechanism, or the strapping mechanisms, as may be desired for the particular character of box which is to be operated upon by my machine.

Since the particular machine illustrated herein is a nailing machine employed for nailing the ends of covers to the ends of boxes or crates, I have illustrated a crossframe 7 as extending between the upper ends of the side frames 1 and 2, the frame 7 having a pair of forwardly projecting cross heads 8 and 9, one mounted near each of its ends, spaced apart from each other substantially equal to the distance between the ends of the box or crate to be lidded. The supporting cross heads 8 and 9 each carry a plurality of nail punches 10 suitably spaced to drive a series of nails through the end of the cover into the end walls of the box. Each of the cross heads 8 and 9 carries a pressing head 11 which is preferably slidably mounted upon the respective cross head by means of suitable vertical slide bearings 12.

A plurality of nail chucks 13 are mounted upon the pressing head 11, these nail chucks preferably extending slightly below the lower edge of the pressing head 11 so as to form an abutment engaging the ends of the cover during the pressing and nailing operations. The pressing head 11 is normally held in downward spaced relation to the nailing head 9 and is permitted its vertical sliding movement by suspending mechanism consisting essentially of a pair of toggle link systems 14 and 15 between the midpoints 16 of which is interposed a tension spring 17 so that the tension spring 17 normally urges the pressing head 11 downwardly from the nailing head 9 to the position shown in Fig. 2, until the cover is pressed up against the nail chucks 13 with sufficient force to expand the toggle link systems 14 and 15 against the force of the spring 17 whereupon the pressing head is lifted relative to the nailing head 9 causing the nail punches 10 to pass through the nail chucks 13 and drive the nails downwardly through the cover. This manner of mounting a pressing head upon a nailing head is described in detail in my copending application Serial No. 14,496, filed April 3, 1935, wherein the function of the toggle link systems and spring are described and explained to show that with a predetermined tension upon the spring 17 the movement of the pressing head toward the nailing head while stretching the spring 17 transmits the forces of the spring through constantly reducing vertical components, thereby permitting not more than a predetermined amount of pressure to be exerted by the pressing head irrespective of the amount of movement thereof relative to the nailing head 9.

The operation of pressing the cover upon the box is accomplished by movement of the box and the pressing head relative to each other and in the form of the device illustrated herein I prefer that the nailing head 9 should be mounted stationarily upon the machine and that the box be moved upwardly toward the nailing head 9 to accomplish the nailing operation. This may be readily accomplished by providing a box supporting table, sometimes called a "nailing table", indicated by the reference character 19, adapted to receive and hold a box 20 to be lidded. The construction of the box supporting table 19 may vary in form, though I prefer to provide a substantially rectangular frame consisting of front and rear rails 21 and 22 (Fig. 5), respectively, interconnected at their ends by cross rails 23 and 24 and braced by additional cross bars 25 (Fig. 1), any number of which may be employed. The front and rear rails 21 and 22 are provided with suitable bearing members 26 in which may be journaled a plurality of rollers 27 forming the nailing table frame into a substantial section of roller conveyer over which the boxes 20 may readily be drawn inwardly for the lidding operation and outwardly of the machine after the lidding operation has been completed.

The box supporting table 19 is mounted for vertical movement relative to the frame of the machine as by providing a pair of rollers 28 at the extreme ends of the cross bar 23 and 24 engageable in suitable vertical guides 29 formed upon the vertically extending portion of the end frames 1 and 2, respectively and by forming a downwardly extending frame structure on the box supporting table 19 consisting of a vertical bar 30, 31 near opposite ends of the nailing table which are connected at their upper ends to cross bars 25 on the box supporting table frame and having their lower ends interconnected by means of a spacer bar 33. The outer ends of the spacer bar 33 are provided with rollers 34 and 35 operating in guide channels 36 formed upon the inner faces of the end of the side frames 1 and 2 near the forward limits of these frames. Thus the box supporting table 19 may be lifted upwardly in its guides 29 and 36, or lowered in these guides to lift the box 20 toward the pressing head 11 and the nailing head 9.

The lifting and lowering of the table is preferably accomplished by power which may be derived from a suitable motor 37 (Fig. 1) mounted upon a motor support 38 constituting essentially a sleeve 39 mounted upon a shaft 40 and having a downwardly extending leg 41 engaging a tie rod 42 extending between the side frames 1 and 2. Thus while the motor 37 is mounted upon the shaft 40 it is prevented from rotating relative to the shaft by the engagement of the leg 41 with stationary tie rod 42 (Fig. 2). The motor 37 is provided with a suitable pinion 43 meshed with a gear 44 rigidly secured upon the shaft 40 so that operation of the motor 37 will cause rotation of the shaft 40. The shaft 40 is journaled in suitable bearings 46 and 47 in the side frames 1 and 2, respectively, and is provided just inwardly of the side frames 1 and 2 with a pair of drums 48 and 49, each of which is rigidly secured to the shaft 40 and rotatable therewith. Pinned as at 50 to the drum 48 is one end of the drive chain 51, the opposite end of which is secured as indicated at 52 to the spacer bar 33, the chain passing over a guide drum 53 rotatably mounted upon a shaft 54 extending between the side frames 1 and 2 at a point considerably higher than the point of attachment of the chain to the spacer bar 33. At the opposite side of the machine a similar chain 55 is secured between the drum 49 and the spacer bar 33 passing over a guide drum 56 also mounted upon the shaft 54. Thus upon rotation of the shaft 40 by the motor 37 the chains 51 and 55 will be wound up on the drums 48 and 49 and will lift the box supporting table 19 upwardly toward the pressing head 11 and the nailing table 9 and upon reverse rotation of the shaft 40 the table will be lowered back to its normal position, as shown in Fig. 2.

It will thus be seen that only during the time that it is desired to actually elevate the table 19 will it be necessary to operate the motor 37. In order to control the operations of the motor 37 when it is desired to lift and lower the table, I provide a suitable motor controlling switch 57 which is preferably formed as a reversing switch, the operating lever 58 of which, when in its central position as shown in Fig. 2, will cause the circuit to the motor 37 to be opened, while movement of the lever 58 downwardly will cause the motor to operate to drive the shaft 40 in a clockwise direction, and when the lever 58 is moved upwardly current to the motor will be reversed so as to cause the motor to operate in a counter-clockwise direction. The control of the switch 57 is preferably through the agency of a foot pedal 59 pivoted as at 60 on a frame 61 which is secured by set screws to one of the cross tie rods 62 constituting the cross ties between the side frames 1 and 2. The foot pedal 59 is provided with a link 63 connected to the operating lever 58 of the switch so that depression of the pedal 59 by the foot of the operator will cause the switch 57 to operate the shaft 40 in a clockwise direction.

It will be understood that depression of the pedal 59 will actuate the switch 58 to start the motor 37 in the proper direction to elevate the nailing table, while at any time after the nailing table has been elevated from its lowermost position release of the pedal 59 will permit the switch 57 to be actuated to such position as will cause the motor 37 to be reversed from lowering the nailing table back to its normal lowermost position. Thus, if, after the operator has started the lifting movement of the nailing table it should appear that any of the fruit or contents of the box are likely to be damaged by pressing the cover down thereupon, or that the cover is not properly adjusted relative to the box, the operator may remove his foot from the pedal 59 whereupon the table will immediately descend, permitting the operator to readjust the cover or the contents to their proper positions.

It will be noted at this point that the motor is energized both when the nailing table is to be elevated and also when the nailing table is to be lowered. As will be understood by those skilled in the art, the combined weight of the table and the box supported thereby is more than sufficient to overcome any friction between the nailing table and its guiding means. The nailing table will tend to fall as soon as the brake (hereinafter described) is released. The motor, which is energized during the descent of the table, will therefore control the table during its descent. Thus the motor may be employed as a brake during the lowering operations of the table and prevent the too rapid descent of the nailing table. Moreover, it is desirable that the final lowering movements of the nailing table should be retarded so as to avoid unnecessary shocks upon the machine. To accomplish this purpose, I provide a cam 64 carried by and movable with the box supporting table 19 to engage a finger 65 constituting one end of a bellcrank 66 pivoted to the switch supporting frame 61, the opposite end of the bellcrank 66 being connected through links 67 to the switch operating lever 58. The cam 64 is preferably mounted upon a vertically extending rod 68 extending between the supporting table 19 and the spacer bar 33 so that it will engage the finger 65 when the table has been lowered almost to its lowermost position and will swing the switch-operating lever 58 back to its central or neutral position, thus de-energizing the motor 37, just before the table comes to rest in its lowermost position. It will be noted that up to the time of deenergizing the motor 37 the table will have been descending under the influence of gravity and the descent will be controlled by the brake action of the motor when energized in its reverse direction. Upon the deenergization of the motor, as noted above, the table will then tend to rapidly move downwardly to its final position.

Figure 5:
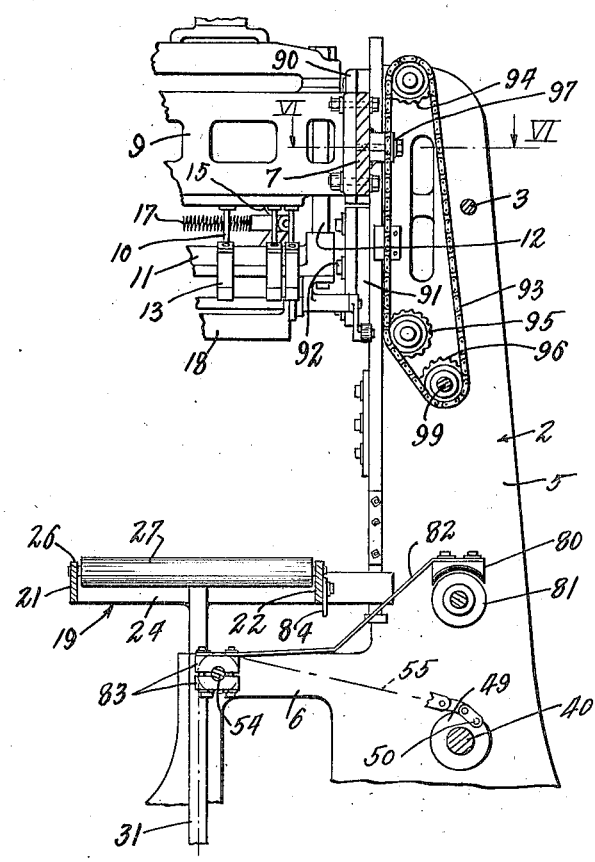
Fig. 5 is a detail sectional view, taken along line V—V of Fig. 1, illustrating the adjustable mounting of the nailing mechanism on the machine.

To prevent the table from falling too rapidly at this time and further to bring the table to a smooth stop in its lowermost position, I provide a braking mechanism to be applied to the motor 37, illustrated particularly in Fig. 5 of the drawings as comprising a brake shoe 80 normally suspended immediately above a brakedrum 81 formed upon or secured to the end of the motor shaft. The brake shoe 80 is supported upon the outer end of a relatively thin springlike arm 82 rigidly mounted as by means of a clamp 83 upon the shaft 54 which constitutes the mounting for the pulleys 53 and 56.

The spring action of the arm 82 normally tends to hold the brake shoe 80 away from its drum 81, but by providing a bar 84 attached to the side rail 22 of the nailing table 19 and extending slightly below the nailing table the arm 82 will be engaged by the bar 84 and slightly depressed as the nailing table reaches its lowermost position, thus applying the brake shoe 80 to the motor to bring the same gently to rest.

However, if the cover press is properly adjusted and there is no danger of injury to the contents of the box, the operator maintains pressure upon the pedal 59, continuing the operation of the motor 37, thus pressing the box 20 up to engage the cover, which cover will have its ends engaged by the chucks 13, the continued upward pressure by the box causing the nail chucks 13 to spring the ends of the cover down into contact with the ends of the box. Thereafter further upward movement of the table 19 will move the press head 11 upwardly toward the stationary nailing head 9, causing the nails to be driven through the chucks by the punches 10 as the chucks are lifted toward the nailing head 9.

Figures 3, 4:
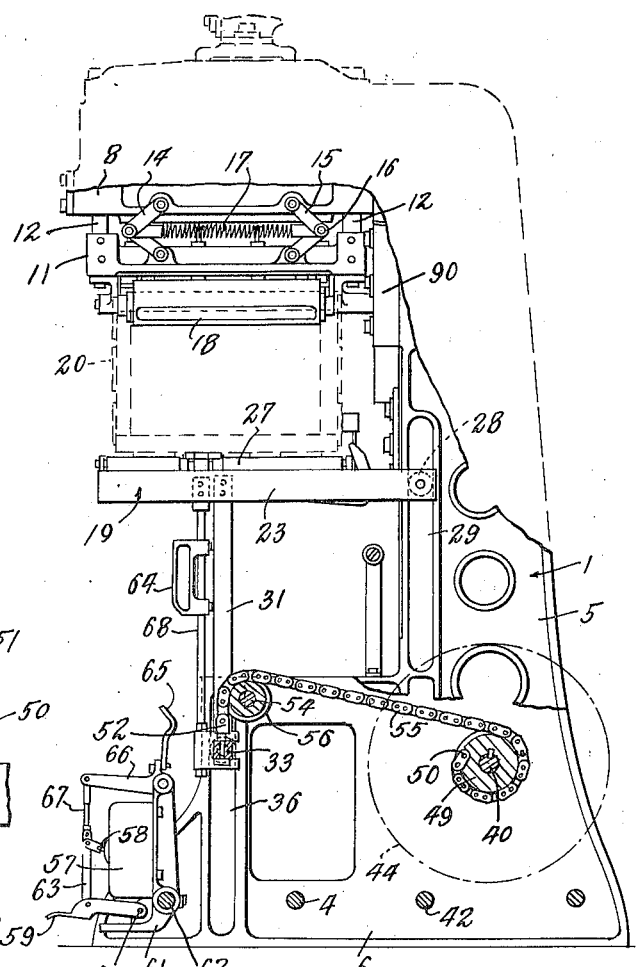
Fig. 3 is a detail side elevational view similar to Fig. 2, illustrating the box supporting table in its elevated position.
Fig. 4 is a detail sectional view, taken along line IV—IV of Fig. 2, illustrating the pressure-limiting mechanism interposed between the source of power and the operating element of the machine.

When the nailing operations have been completed, that is, when the upward movement of the box 20 has been sufficient to drive the nails just flush with the top of the cover, no further upward movement should occur, even though the operator may continue to hold the pedal 59 actuated. To prevent such further upward movement and in effect to limit the maximum force which may be exerted upon the box and its cover, I prefer to interpose between the gear 44 and the shaft 40 a friction or slip coupling, illustrated particularly in Fig. 4. This coupling comprises a pair of opposed discs 70 and 71, the disc 70 being keyed as at 72 upon the shaft 40, while the disc 71 is free of the shaft 40 but is spring-pressed toward the disc 70 by means of a plurality of springs 73 surrounding bolts 74 extending from the disc 70.

The gear 44 is illustrated as comprising an outer rim 75 from which a radial flange 76 extends inwardly to be engaged between the discs 70 and 71, suitable friction material 77 being preferably interposed between the meeting surfaces of the discs 70 and 71 and the flange 76 to insure the proper amount of friction between these members. By proper adjustment of the springs 73 a predetermined resistance built up by the engagement of the box and cover with the pressing head 11 and nailing head 9, will cause the slippage between the gear 44 and the shaft 40, thus positively limiting the amount of pressure which can be built up.

Figure 6:
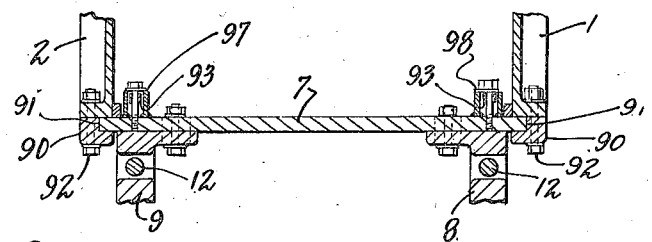
Fig. 6 is a detail sectional view, taken along line VI—VI of Fig. 5.

By referring particularly to Figs. 5 and 6 it will be noted that the supporting frame 7 for mounting the nailing mechanism to the pressing mechanism is secured between the frames 1 and 2 as by providing a gib 90 on each of the frames 1 and 2 to form a vertically extending guideway 91 in which the frame 7 may be slidably supported, the gibs 90 being secured to the frame members 1 and 2 by means of a plurality of bolts 92 which, when tightened, will clamp the gibs against the frame 7 and hold the same stationarily in place. By employing this type of mounting, it will be apparent that by loosening the bolts 92 the entire frame 7 and its cross heads 8 and 9 may be moved upwardly or downwardly to adjust the machine for boxes of varying heights and the gibs again clamped tightly to hold these members in their new positions. To assist in the raising or lowering of the frame 7, I prefer to provide a pair of chains 93 near opposite ends of the frame 7, each of these chains passing over sprockets 94, 95 and 96, one of the chains being secured near one end of the frame 90, as indicated at 97, while the other of the chains will be connected near the opposite end of the frame 7, as indicated at 98.

The sprockets 96 for the pair of chains 93 are preferably rigidly secured upon a shaft 99 extending between the frames 1 and 2, one end of the shaft 99 being squared off to receive a crank 100 by which the chains 93 may be simultaneously moved to lift or lower the frame 7 and the structure supported by it.

With the nailing table and the nail driving mechanism in the positions shown in Figs. 1 and 2, that is, in the normal rest positions, a box may be placed upon the nailing table by drawing the same laterally across the nailing table 21 over the rollers 27 until the ends of the box are aligned with the nail driving mechanisms 10 and 13. It is assumed that the box has been filled with suitable contents and in ordinary circumstances these boxes are filled to overflowing, some of the contents protruding above the top covers of the box, making it necessary that a cover to be placed thereon must be flexed or bent downwardly over the protruding contents until the cover ends are brought into contact with the box ends where they may be nailed. A cover, preferably formed of relatively thin material so as to be capable of being flexed under pressure is then placed in the machine above the box and may be supported in this position by any suitable means, either by allowing the ends of the cover to rest upon the cover 18 or by providing upon the machine some mechanism which will engage and hold the cover as is well understood by those skilled in this art.

The operator then steps upon the pedal 59, depressing the same, thus energizing the motor 37, causing the motor to rotate the drive shaft 40, winding the chains 51 and 55 about the drums 48 and 49. Winding up of the chains 51 and 55 will cause the nailing table with its loaded box to be lifted toward the nail driving mechanisms 13 until the protruding contents of the box are brought into engagement with the cover which now overlies the same. The continued upward movement of the nailing table will then press the cover upwardly until the ends of the cover are engaged by the roller surfaces of the nail chucks 13 while still further upward movement of the nailing table will press the box upwardly toward the nail chucks 13 until the ends of the cover, held against upward movement by the rail chucks 13, have been brought into contact with the ends of the box.

Still further upward movement of the nailing table presses the cover ends still further upwardly against the nail chucks 13 and since at this time the cover cannot yield any further, due to the fact that the box ends are pressed tightly against the cover ends, the nail chucks and their supporting structure 11 will be lifted upwardly against the forces exerted by the spring 17 and the toggle links 14 and 15, causing these toggle links to yield. This yielding of the toggle links permits the nail chucks to move upwardly toward the stationary nail driving punches 10, forcing the nail punches through the chucks to drive the nails therefrom into and through the cover ends and into the box ends, thus securing the cover to the box. When this nail driving action has taken place, further upward movement of the box and its cover is resisted by the stationary nail punches 10 and their supporting nailing heads 8 and 9, and at this time the friction coupling 70—71 will slip, preventing unnecessary stalling of the motor. The operator may then release the pedal 59, which will allow the switch 58 to be reversed, energizing the motor in the reverse direction, allowing the shaft 40 to unwind the chains 51 and 55 from their drums, and allowing the nailing table 19 to descend. As the nailing table approaches its lowermost position the cam 64 will engage the finger 65 and move the switch 58 back to its neutral or off position, thus disconnecting the motor while during the last or final downward movement of the nailing table the nailing table will engage and operate the spring brake 82, retarding the final downward movement of the nailing table and bringing the same gently to rest. The box may then be removed from the machine in another box and cover placed in the machine ready for a second operation.

While I have shown and described the preferred embodiment of my invention, I do not wish to be limited to any of the details of construction shown herein, except as defined in the appended claims.

I claim:

1. In a box lidding machine, means for supporting a box to be lidded, means disposed above said supporting means for applying lids to boxes, means mounting said box supporting means for elevation toward said lid applying means, a power shaft, one or more chains connected to said power shaft and coupled to said box supporting means, a pulley for each of said chains over which said chains are disposed and means mounting said pulleys above the point of attachment of said chains to said box supporting means whereby rotation of said power shaft in one direction will wind up said chain and lift said box supporting means, and means for supplying power to rotate said shaft including a friction coupling for limiting the lifting force applied to said box supporting means.

2. In a box lidding machine, means for supporting a box to be lidded, means disposed above said supporting means for applying lids to boxes, means mounting said box supporting means for elevation toward said lid applying means, a power shaft, a chain connected to said power shaft and coupled to said box supporting means whereby rotation of said power shaft in one direction will wind up said chain, and lift said box supporting means, reversible power means for operating said power shaft in either direction, control means for said power means for actuating said power means in one direction to lift said box supporting means and for actuating the power means in the reverse direction to lower said box supporting means, and means actuated by said box supporting means when in non-elevated position for preventing actuation of said power means in said reverse direction.

3. In a box lidding machine, means for supporting a box to be lidded, means disposed above said box supporting means for applying lids to boxes, means for moving said box supporting means vertically between a lower normal position in spaced relation to said lid applying means permitting filled boxes to be moved into position between said box supporting means and said lid applying means, and an upper lid applying position for pressing lids upon boxes placed therebetween, frame means having vertical guides thereon, means slidably mounting said lid applying means on said guides for vertical adjustment therealong, means for moving said lid applying means along said guides to adjust said machine to apply lids to boxes of different heights, and means for locking said lid applying means in stationary rigid engagement with said guides in any position of adjustment therealong.

HERBERT E. TWOMLEY.